US012680620B2

(12) United States Patent
Hernandez et al.

(10) Patent No.: US 12,680,620 B2
(45) Date of Patent: Jul. 14, 2026

(54) FAUCET ROUGH-IN ASSEMBLY

(71) Applicant: AS America, Inc., Piscataway, NJ (US)

(72) Inventors: Jose David Hernandez, Escobedo (MX); Jesus Garcia, Monterrey (MX)

(73) Assignee: AS America, Inc., Piscataway, NJ (US)

( * ) Notice: Subject to any disclaimer, the term of this patent is extended or adjusted under 35 U.S.C. 154(b) by 0 days.

(21) Appl. No.: 18/525,970

(22) Filed: Dec. 1, 2023

(65) Prior Publication Data

US 2024/0183459 A1 Jun. 6, 2024

Related U.S. Application Data

(60) Provisional application No. 63/429,303, filed on Dec. 1, 2022.

(51) Int. Cl.
| | |
|---|---|
| *F16K 11/00* | (2006.01) |
| *F16K 11/22* | (2006.01) |
| *F16K 27/06* | (2006.01) |

(52) U.S. Cl.
CPC ............ *F16K 19/006* (2013.01); *F16K 11/22* (2013.01); *F16K 27/06* (2013.01)

(58) Field of Classification Search
CPC ...... F16K 19/006; F16K 11/22; F16K 11/207; E03C 1/0401; E03C 1/042
See application file for complete search history.

(56) References Cited

U.S. PATENT DOCUMENTS

| | | | | |
|---|---|---|---|---|
| 1,929,536 | A | * | 10/1933 | Schulte, Jr. ........... F16K 19/006 29/890.141 |
| 2,659,389 | A | * | 11/1953 | Harvey ................. F16K 19/006 137/359 |
| 3,229,710 | A | * | 1/1966 | Keller, III ........... F16K 27/0263 251/360 |
| 3,387,309 | A | * | 6/1968 | Johnson .................. E03C 1/042 4/696 |
| 3,448,768 | A | * | 6/1969 | Keller ................... F16K 19/006 29/890.141 |
| 4,989,633 | A | | 2/1991 | Humpert et al. |
| 6,195,818 | B1 | * | 3/2001 | Rodstein ............... E03C 1/0401 137/359 |
| 7,472,434 | B1 | * | 1/2009 | Moldthan ............. E03C 1/0401 4/678 |
| 7,934,520 | B2 | * | 5/2011 | Esche ................... F16K 31/602 137/606 |
| 9,464,416 | B1 | | 10/2016 | Breda |
| 10,718,104 | B2 | | 7/2020 | Slothower |
| 2008/0099089 | A1 | * | 5/2008 | Yang ................... F16K 11/0445 137/625.48 |
| 2009/0250120 | A1 | * | 10/2009 | Robbins ................. E03C 1/021 137/360 |

(Continued)

*Primary Examiner* — Reinaldo Sanchez-Medina
(74) *Attorney, Agent, or Firm* — Morrison & Foerster LLP

(57) ABSTRACT

A thermoplastic rough-in body for a wall-mount faucet, comprising a cold water inlet configured to fluidly couple to a cold water source and a hot water inlet configured to fluidly couple to a hot water source; a first chamber configured to receive a first handle/cartridge assembly and a second chamber configured to receive a second handle/cartridge assembly; an outlet configured to fluidly couple to a faucet spout assembly; a cold water flow channel, a hot water flow channel, and a mixing chamber.

19 Claims, 4 Drawing Sheets

(56)         References Cited

U.S. PATENT DOCUMENTS

| | | | |
|---|---|---|---|
| 2014/0026387 A1* | 1/2014 | Chen | E03C 1/021 |
| | | | 4/658 |
| 2015/0136257 A1* | 5/2015 | Shih | F16K 11/207 |
| | | | 137/603 |
| 2016/0265200 A1 | 9/2016 | Slothower | |
| 2016/0312448 A1 | 10/2016 | Breda | |
| 2016/0348345 A1* | 12/2016 | Rowland | E03C 1/18 |
| 2021/0340743 A1* | 11/2021 | Zhang | F16K 31/60 |

* cited by examiner

FAUCET ROUGH-IN ASSEMBLY

The disclosure is directed to a rough-in assembly for a wall-mount lavatory faucet, in particular to a rough-in assembly having a thermoplastic rough-in body.

BACKGROUND

Rough-in assemblies for wall-mount lavatory faucets may comprise casted or forged brass metal. Brass is an alloy of copper and zinc, and often contains small amounts of lead as well for ease of machining. It is highly desirable to remove any lead from water delivery systems. Further, casted or forged brass rough-in assemblies require a secondary machining process to provide coupling features, for example threaded connections configured to couple to brass nipple adapters. Such coupling features may only couple to specific nipple adapters. Also desired is a rough-in assembly configured to couple to a variety of different adapters.

SUMMARY

Accordingly, disclosed is a rough-in body for a wall-mount faucet, comprising a cold water inlet configured to fluidly couple to a cold water source and a hot water inlet configured to fluidly couple to a hot water source; a first chamber configured to receive a first handle/cartridge assembly and a second chamber configured to receive a second handle/cartridge assembly; an outlet configured to fluidly couple to a faucet spout assembly; a cold water flow channel, a hot water flow channel, and a mixing chamber, wherein the rough-in body comprises a thermoplastic, and the cold water inlet, the hot water inlet, the cold water flow channel, the hot water flow channel, the mixing chamber, and the outlet are in flow communication.

In some embodiments of the rough-in body as described herein, each of the cold water inlet, the hot water inlet, the outlet, the first chamber, and the second chamber may comprise a central axis, the cold water inlet central axis and the hot water inlet central axis are parallel, the first chamber central axis and the second chamber central axis may be parallel and may be perpendicular to the cold water inlet central axis and to the hot water inlet central axis, and the outlet central axis may be parallel with the first chamber central axis and with the second chamber central axis.

In some embodiments of the rough-in body as described herein, the cold water flow channel and the hot water flow channel each may comprise a central axis, and the cold water flow channel central axis and the hot water flow channel central axis may be aligned and may be perpendicular to the cold water inlet central axis and to the hot water inlet central axis, and may be perpendicular to the outlet central axis.

In some embodiments of the rough-in body as described herein, the mixing chamber may comprise a central axis, and the mixing chamber central axis may be aligned with the outlet central axis.

In some embodiments of the rough-in body as described herein, the rough-in body may comprise an engineering thermoplastic.

In some embodiments of the rough-in body as described herein, the rough-in body may comprise an engineering thermoplastic selected from polyamides, polyesters, polycarbonates, acrylonitrile-butadiene-styrene, polysulfones (PSU), polyethersulfones (PESU), cyclic olefin copolymer (COC), acrylonitrile-styrene-acrylate (ASA), polyphenylene oxides (PPO), polyphenylene sulfides (PPS), polyphenylenesulfones (PPSU), polyether ether ketones (PEEK), polyethylenimine (PEI), polyphthalamides (PPA), polyacetals, copolymers thereof, and blends thereof.

In some embodiments of the rough-in body as described herein, the rough-in body may comprise a glass-filled polyamide or a glass-filled polyphthalamide.

In some embodiments of the rough-in body as described herein, the rough-in body may comprise an injection molded thermoplastic.

In some embodiments of the rough-in body as described herein, the rough-in body may comprise a body main part and a body rear wall, wherein the body main part and the body rear wall may be bonded together to form the hot water flow channel and the cold water flow channel.

In some embodiments of the rough-in body as described herein, the cold water inlet and the hot water inlet each may comprise a smooth inner surface configured to receive and couple to a threaded adapter, and once coupled, the threaded adapters are free to rotate within the cold water inlet and the hot water inlet.

In some embodiments of the rough-in body as described herein, the cold water inlet and the hot water inlet may comprise slot-shaped openings, and the threaded adapters may be configured to couple to the cold water inlet and the hot water inlet with a U-clip positioned in the slot-shaped openings.

In some embodiments of the rough-in body as described herein, the outlet may comprise an outer threaded surface configured to threadingly mate with an annular coupling, the annular coupling configured to threadingly couple to a faucet spout assembly.

In some embodiments of the rough-in body as described herein, the first chamber and the second chamber may comprise an outer threaded surface configured to threadingly mate with a handle/cartridge assembly.

In some embodiments of the rough-in body as described herein, the rough-in body may be configured to threadingly couple to cold water handle/cartridge assembly, to a hot water handle/cartridge assembly, and to a faucet spout assembly, and the threaded couplings may be adjustable such that the rough-in valve body may variably positioned within a wall relative to each of the cold water handle/cartridge assembly, the hot water handle/cartridge assembly, and the faucet spout assembly.

In some embodiments of the rough-in body as described herein, the outlet may comprise an annular groove configured to receive an O-ring.

Also disclosed is a rough-in assembly comprising a rough-in body as described herein, and having threaded adapters coupled to each of the cold water inlet and the hot water inlet.

In some embodiments of the rough-in assembly as described herein, the threaded adapters may be coupled to the cold water inlet and the hot water inlet with U-clips positioned in slot-shaped openings.

In some embodiments of the rough-in assembly as described herein, the threaded adapters may comprise brass.

In some embodiments of the rough-in assembly as described herein, the threaded adapters may comprise an inner threaded surface.

In some embodiments of the rough-in assembly as described herein, the threaded adapters may be free to rotate relative to the cold water inlet and the hot water inlet.

In some embodiments of the rough-in assembly as described herein, the assembly may comprise a threaded coupling coupled to an exterior of the outlet.

In some embodiments of the rough-in assembly as described herein, the threaded coupling may comprise brass and comprise an inner and an outer threaded surface.

Also disclosed is a wall-mount faucet assembly comprising a rough-in assembly as described herein, and a handle/cartridge assembly threadingly coupled to the first chamber and to the second chamber, and a faucet spout assembly threadingly coupled to the outlet.

BRIEF DESCRIPTION OF THE DRAWINGS

This disclosure is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figures 1A, 1B, 1C:
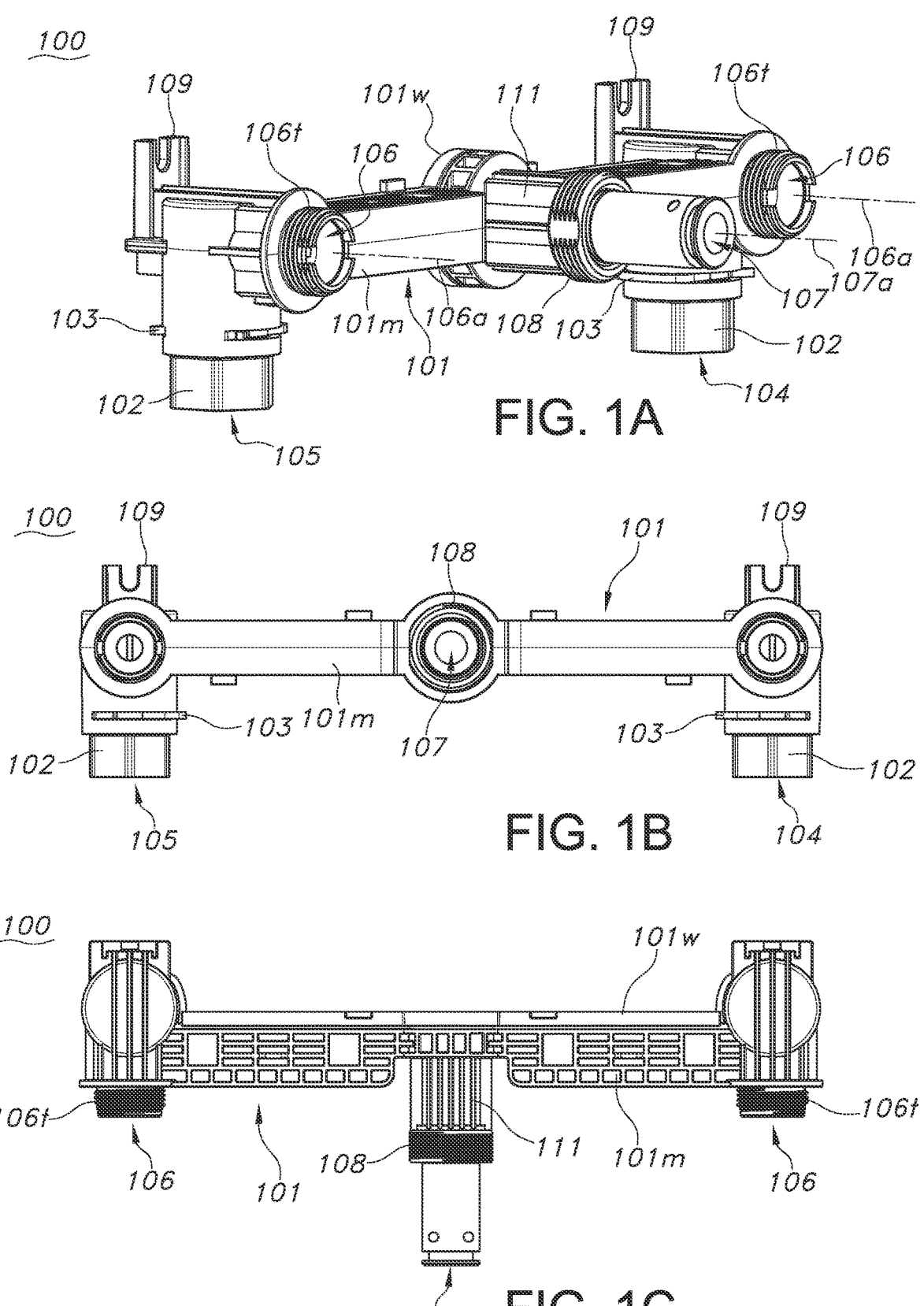
FIG. 1A, FIG. 1B, and FIG. 1C provide views of a rough-in assembly for a wall-mount lavatory faucet, according to some embodiments.

FIG. 1A shows rough-in assembly 100, according to an embodiment. FIG. 1B and FIG. 1C provide front and top views of rough-in assembly 100, respectively. Rough-in assembly is configured to provide for an 8 inch (about 200 mm) wall-mount bath faucet. Rough-in assembly body 101 comprises an engineering thermoplastic. Body 101 comprises cold water inlet 104, configured to be coupled to a cold water source, and hot water inlet 105, configured to be coupled to a hot water source. Cold water inlet 104 and hot water inlet 105 are fixed with brass adapters 102, having an inner threaded surface (not visible) configured to couple to source water tubing or pipe. Brass adapters 102 are affixed to inlets 104 and 105 with U-clips 103. U-clips 103 may comprise a metal or a thermoplastic, for example stainless steel or a thermoplastic, such as a polyamide. An inner surface of inlets 104 and 105 is smooth, and coupling with U-clips 103 allows adapters 102 to rotate or swivel clockwise or counter clock-wise relative to body 101. This freedom to rotate adapters 102 provides for ease of coupling to source water tubing or pipe.

Rough-in body 101 comprises chambers 106, positioned perpendicularly to inlets 104 and 105. Chambers 106 are configured to receive a faucet handle/cartridge assembly. Chambers 106 are associated with outer threaded surface 106t, configured to threadingly couple to a cartridge nut (not shown). Outlet 107 is configured to couple to a faucet spout. Outlet 107 comprises groove 107g configured to receive an O-ring. Outlet 107 is associated with annular brass coupling 108. Chambers 106 comprise central axes 106a and outlet 107 comprises central axis 107a. Annular coupling 108 comprises an inner threaded surface configured to threadingly couple to body 101, and an outer threaded surface configured to couple to a faucet spout assembly. Rough-in body 101 comprises coupling features 109. Coupling features 109 are configured to provide a coupling to an interior of a wall, for instance to a stud.

Rough-in body 101 comprises water flow paths therein, allowing cold water and hot water to pass to mixing chamber 111 and to outlet 107. Body 101 may be a single molded thermoplastic part. In an embodiment, body 101 may comprise two or more molded parts bonded together. In this embodiment, body main part 101m is bonded to body rear wall 101w to form body 101. Rear wall 101w may comprise a same or different thermoplastic than body main part 101m. Bonding rear wall 101w to body main part 101m may be accomplished for example with an adhesive or with ultrasonic welding.

Figure 1D:
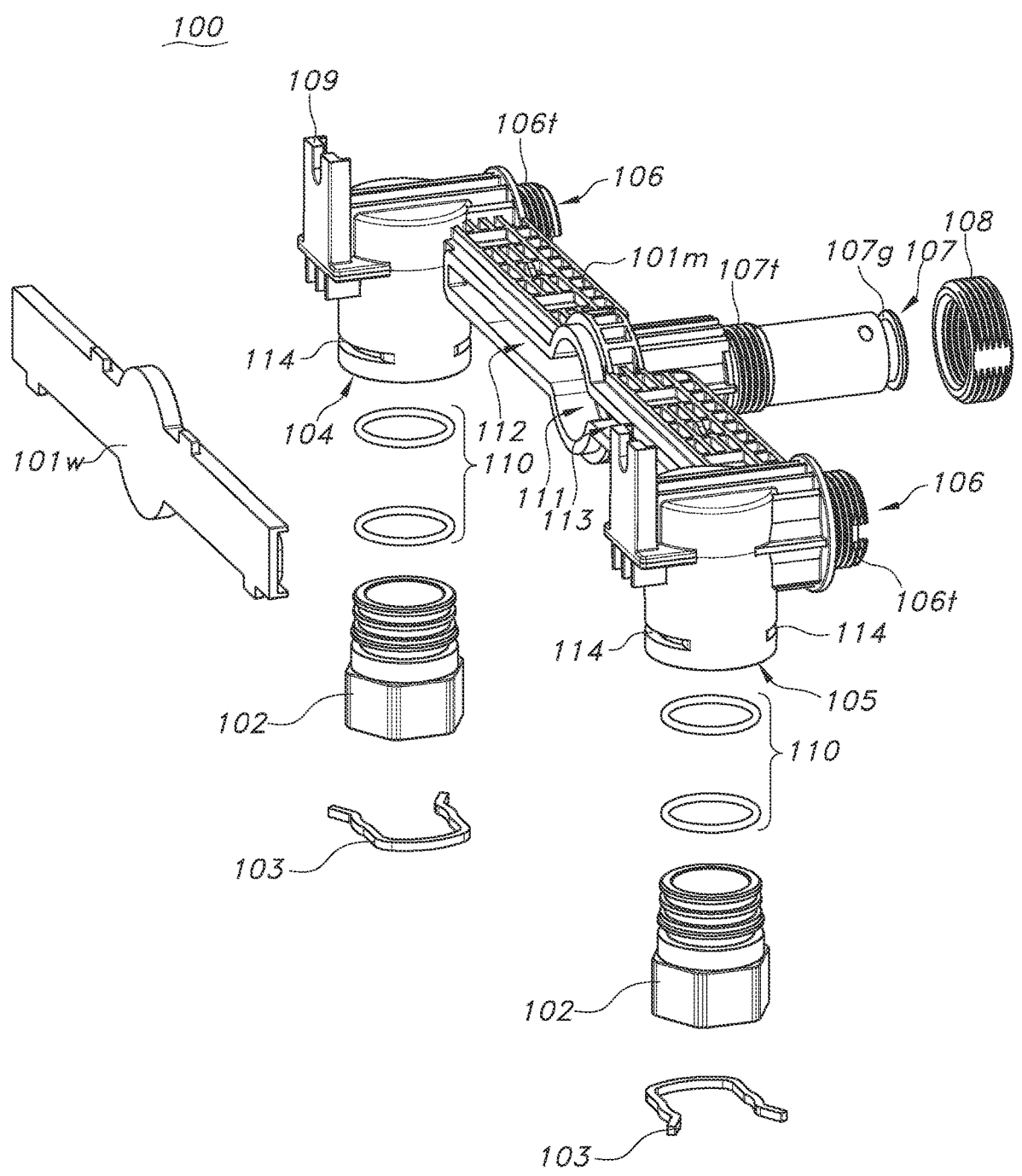
FIG. 1D provides an exploded view of a rough-in assembly for a wall-mount lavatory faucet, according to an embodiment.

FIG. 1D shows an un-assembled view of rough-in assembly 100, according to an embodiment. Shown are rear wall 101w which will be bonded to body main part 101m to form thermoplastic body 101. Body 101 comprises cold water inlet 104 and hot water inlet 105, each having a smooth inner surface, and configured to receive brass adapters 102 with O-rings 110. Brass adapters 102 are affixed to body 101 with U-clips 103 inserted through (2) slot-shaped openings 114. Body 101 comprises cold water flow channel 112 and hot water flow channel 113, in flow communication with inlets 104 and 105 respectively, and both in flow communication with mixing chamber 111. Outlet 107 is in flow communication with mixing chamber 111. Outlet 107 is associated with outer threaded surface 107t, configured to threadingly couple to brass coupling 108. Coupling 108 comprises an outer threaded surface configured to threadingly couple to a faucet spout assembly.

Figure 1E:
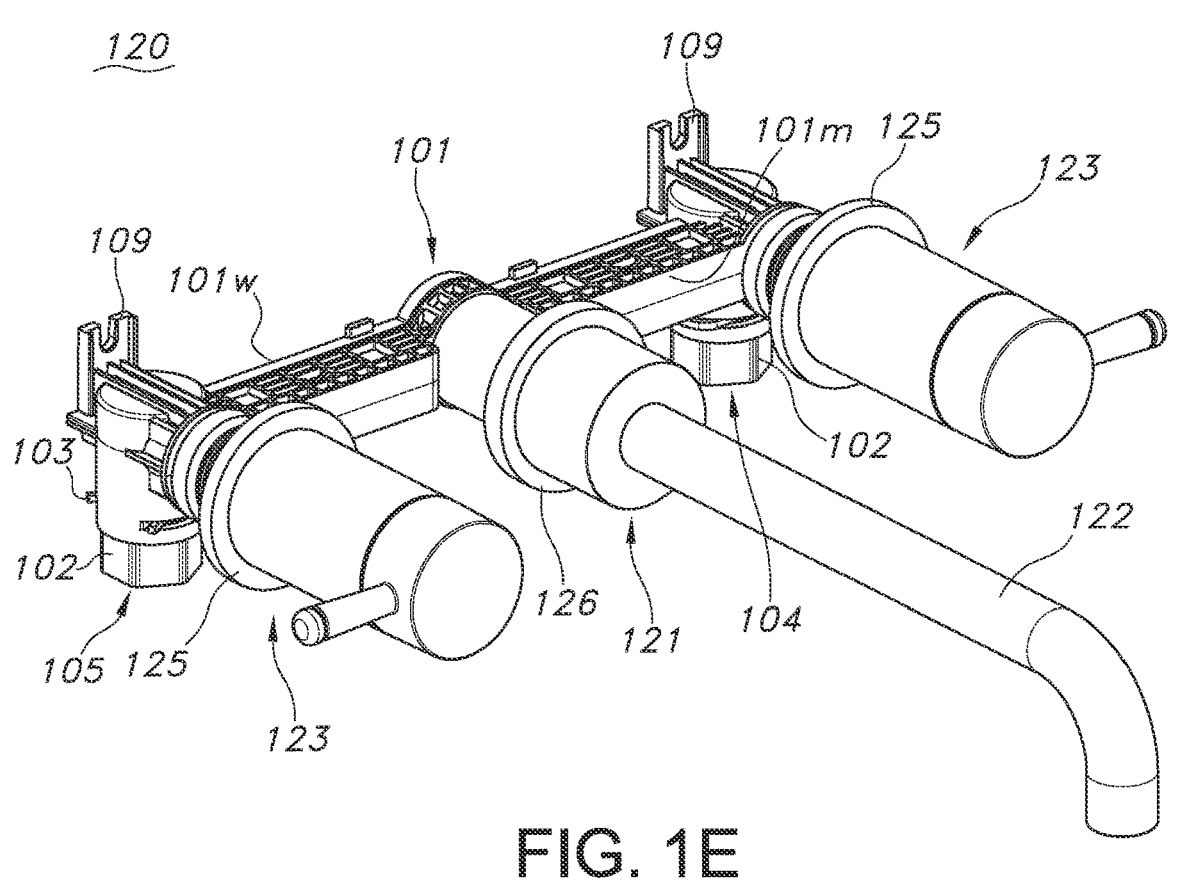
FIG. 1E shows a wall-mount lavatory faucet assembly, according to an embodiment.
Figure 1F:
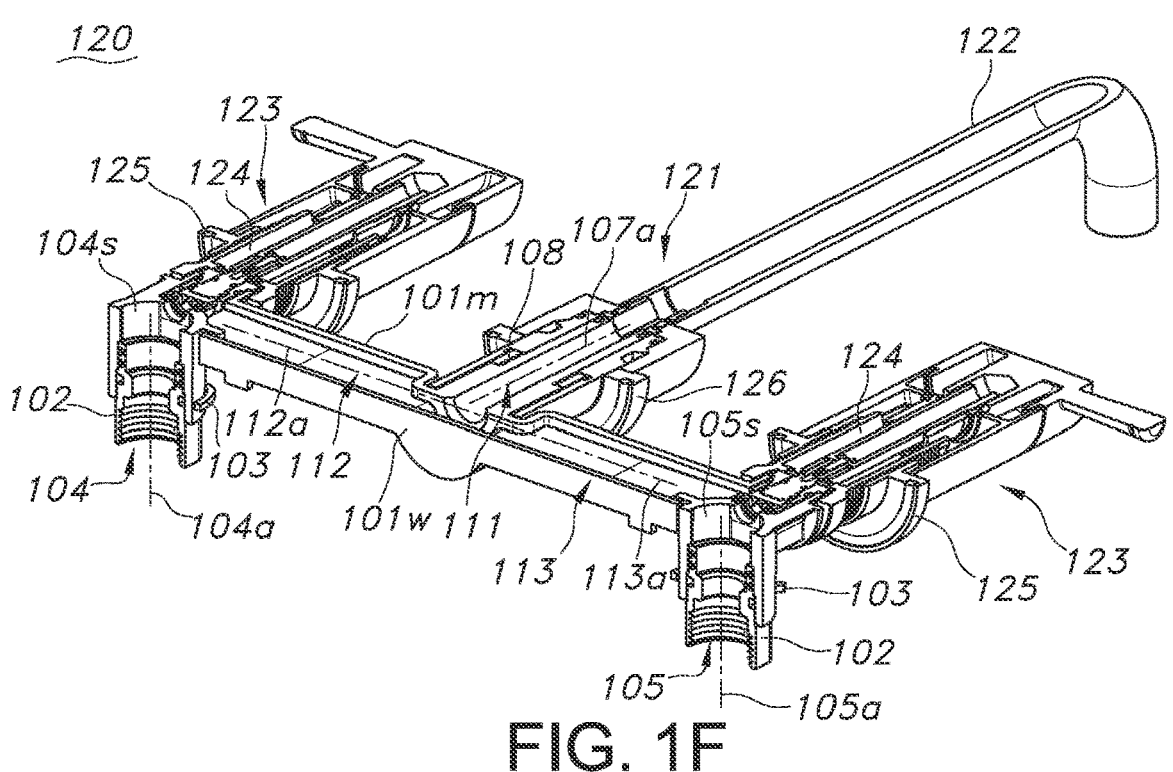
FIG. 1F provides a cross-section view of a wall-mount lavatory faucet assembly, according to an embodiment.

FIG. 1E provides a view of wall-mount faucet assembly 120, and FIG. 1F provides a cross-section view of wall-mount faucet assembly 120, according to some embodiments. Faucet spout assembly 121, comprising faucet spout 122, is threadingly coupled to outlet 107 with brass coupling 108. Handle/cartridge assemblies 123 are threadingly coupled to chambers 106 with cartridge nuts 124. Brass adapters 102 are coupled to inlets 104 and 105 with U-clips 103. Inlets 104 and 105 have smooth inner surfaces 104s and 105s, respectively. Visible is cold water flow channel 112, hot water flow channel 113, and mixing chamber 111. Trim features 125 and 126 of handle/cartridge assemblies 123 and faucet spout assemblies 121, respectively, are configured to abut a wall above a sink. FIG. 1F illustrates cold water inlet 104 central axis 104a, hot water inlet 105 central axis 105a, cold water flow channel 112 central axis 112a, hot water flow channel 113 central axis 113a, and outlet 107 (and mixing chamber 111) central axis 107a. Central axes 104a and 105a may be parallel with each other and perpendicular to central axes 112a and 113a. Central axes 104a and 105a may be perpendicular to central axes 106a, and may intersect central axes 106a. Central axis 107a may be perpendicular to central axes 112a and 113a. Central axes 112a and 113a may be aligned and meet at central axis 107a.

Figures 1G, 1H:
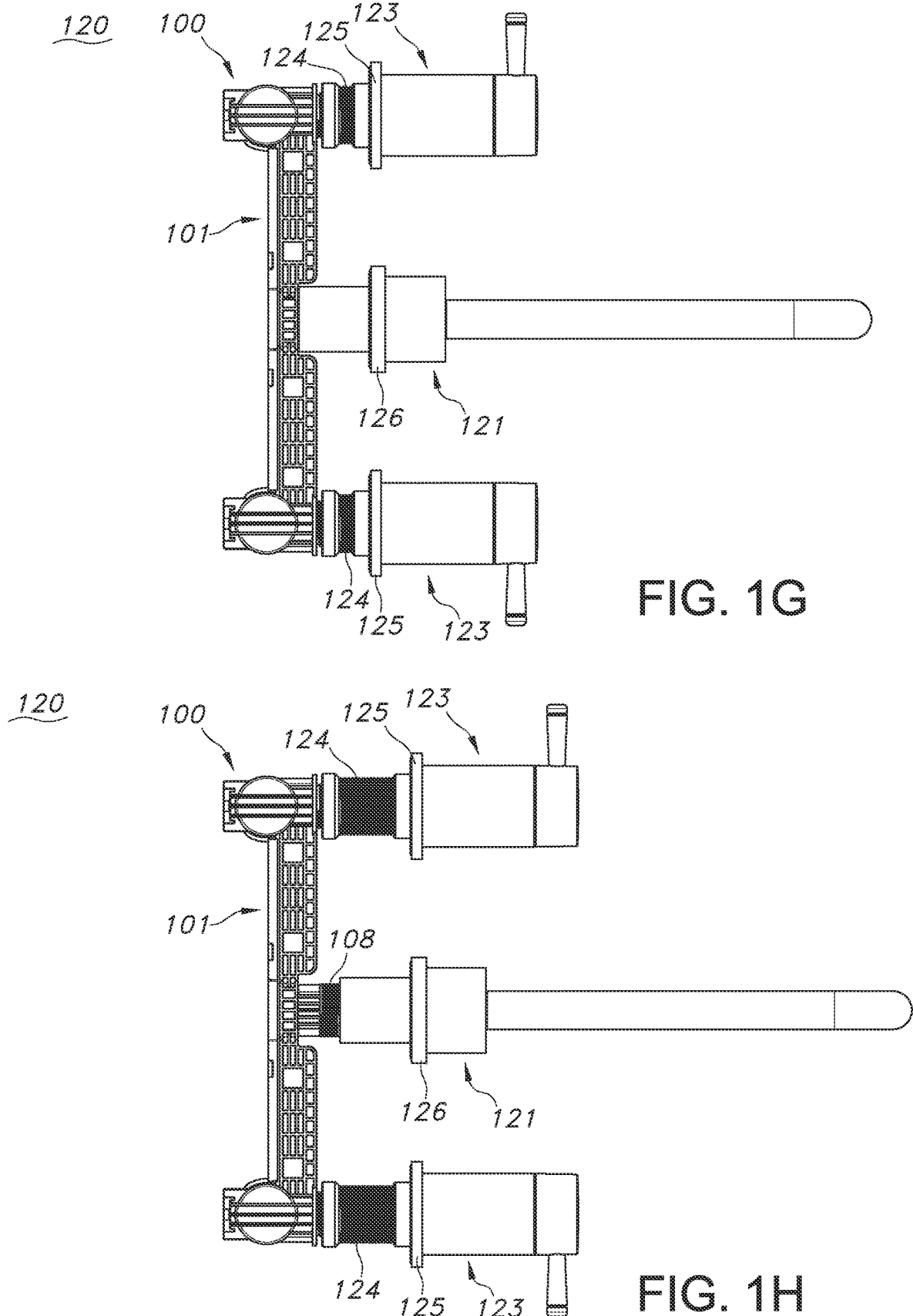
FIG. 1G and FIG. 1H show views of a wall-mount lavatory faucet assembly, according to some embodiments.

FIG. 1G and FIG. 1H show top views of wall-mount faucet assembly 120, according to some embodiments. Assembly 120 comprises a "telescopic" feature, wherein depending upon how deep rough-in assembly 100 is positioned within a wall, faucet spout assembly 121 and handle/cartridge assemblies 123 may be positioned accordingly relative to rough-in assembly 100 to compensate. In FIG. 1G, assembly 100 is positioned close to a wall (close to trim features 125 and 126), and faucet spout assembly 121 and handle cartridge assemblies 123 are threadingly coupled to brass coupling 108 and cartridge nuts 124 close to a wall position. In FIG. 1H, assembly 100 is positioned deeper within a wall, exposing more of cartridge nuts 124 and exposing a portion of brass coupling 108 within a wall. A distance between positons of body 100 from FIG. 1G to FIG. 1H as shown is about 25 mm.

In some embodiments, a rough-in assembly body may comprise a thermoplastic. Thermoplastics may include a polypropylene, a polyethylene, a polyester, a polyamide, a polystyrene, mixtures thereof, or copolymers thereof. Thermoplastics may include engineering thermoplastics. Engineering thermoplastics include for example polyamides, polyesters, polycarbonates, acrylonitrile-butadiene-styrene, polysulfones (PSU), polyethersulfones (PESU), cyclic olefin copolymer (COC), acrylonitrile-styrene-acrylate (ASA), polyphenylene oxides (PPO), polyphenylene sulfides (PPS), polyphenylenesulfones (PPSU), polyether ether ketones (PEEK), polyethylenimine (PEI), polyphthalamides (PPA), polyacetals, copolymers thereof, and blends thereof. Polyamides include nylon and polyphthalamide (PPA). Polyacetals include polyoxymethylene (POM). In some embodiments, a thermoplastic polymer may comprise a glass-filled thermoplastic, for example a glass-filled polyamide. Parts comprising a thermoplastic may be prepared via a molding process, for example injection molding.

In some embodiments, a rough-in assembly body may comprise a single molded thermoplastic part. In other embodiments, a rough-in body may comprise two or more molded thermoplastic parts bonded together. For example, a rough-in body may comprise a main body part and a rear wall part bonded together, for example by an adhesive or welding, e.g. ultrasonic welding.

In some embodiments, a rough-in assembly body may comply with NSF 61 Q1. In some embodiments, a rough-in assembly body may withstand a fatigue life of 500,000 cycles at room temperature at 80 psi internal pressure.

A rough-in assembly body comprises a cold water inlet configured to fluidly couple to a cold water source, and a hot water inlet configured to fluidly couple to a hot water source. Cold source water and hot source water may be delivered by a pipe, e.g. a copper pipe, PEX (cross-linked polyethylene) tubing, PVC pipe, or other common residential pipe or tubing. A rough-in body may define a cold water flow channel fluidly connected to a cold water inlet, and a hot water flow channel fluidly connected to a hot water inlet. A rough-in body may also define a cold/hot water mixing chamber and an outlet. A cold water flow channel and a hot water flow channel may be configured to deliver cold and hot source water to a mixing chamber, and cold/hot mixed water is then configured to be delivered to an outlet.

A rough-in assembly may comprise a first chamber and a second chamber, configured to receive a first handle/cartridge assembly and a second handle/cartridge assembly, respectively. A first handle/cartridge assembly may be configured to control flow of cold source water from a cold water inlet to a cold water flow channel and to a mixing chamber. A second handle/cartridge may be configured to control flow of hot source water from a hot water inlet to a hot water flow channel and to a mixing chamber.

Each of a cold water inlet, a hot water inlet, a cold water flow channel, a hot water flow channel, an outlet and mixing chamber, a first chamber, and a second chamber may comprise a central axis. As illustrated in the figures, a cold water inlet and a hot water inlet may comprise a cylinder-like shape and may each have a central axis which are parallel with each other. A cold water inlet and a hot water inlet may be configured to deliver cold and hot source water in a vertical direction. A cold water flow channel and a hot water flow channel are configured to receive cold source water and hot source water from a cold and hot inlet, respectively. A cold water flow channel and a hot water flow channel may be defined by a rough-in body, and may have a general rectangular-box like shape. A cold water flow channel and a hot water flow channel may be configured to deliver cold source water and hot source water in a horizontal direction towards each other and towards a mixing chamber. In other embodiments, a cold water flow channel and a hot water flow channel may have a cylinder-like shape. A cold water flow channel and a hot water flow channel may each have a central axis with are aligned and perpendicular to central axes of cold and hot water inlets.

An outlet and mixing chamber may comprise a cylinder-like shape and may be defined by a rough-in body. An outlet and mixing chamber may comprise a central axis perpendicular to a cold water flow channel and a hot water flow channel central axes. An outlet and mixing chamber may comprise a central axis which intersects a cold water flow channel and a hot water flow channel central axes. A first chamber central axis and a second chamber central axis may be perpendicular to a cold water inlet central axis and to a hot water inlet central axis. A first chamber central axis and a second chamber central axis may intersect a cold water inlet central axis and a hot water inlet central axis, respectively. A first chamber central axis and a second chamber central axis may be perpendicular to a cold water flow channel central axis and to a hot water flow channel central axis. A first chamber central axis and a second chamber central axis may be parallel to an outlet/mixing chamber central axis. An outlet/mixing chamber may be configured to fluidly couple to a faucet spout assembly.

In an embodiments, a cold water inlet and a hot water inlet may comprise a smooth inner surface, each configured to receive and fluidly couple to a threaded adapter, for instance a brass adapter having an inner threaded surface. In other embodiments, a threaded adapter may comprise a thermoplastic. A cold water inlet and a hot water inlet may each comprise slot-shaped openings configured to receive and couple to a U-clip. A U-clip may comprise metal or an engineering thermoplastic, for instance stainless steel or a polyamide. A cold water inlet and a hot water inlet may be configured to couple to a threaded adapter with a U-clip and one or more O-rings. Such a coupling of a threaded adapter to a source water inlet allows for rotation of "swivel" of the adapter within and relative to the source water inlet. This allows for ease of threadingly coupling a source water pipe or tube to the threaded adapter. In an embodiment, a cold water inlet central axis and hot water inlet central axis may be positioned about 200 mm apart.

In an embodiment, an outlet may comprise an outer threaded surface configured to threadingly couple to an inner threaded surface of an annular coupling. An annular coupling may comprise brass or an engineering thermoplastic. An annular coupling may have an outer threaded surface configured to threadingly couple to a faucet spout assembly. A first chamber and a second chamber may comprise an outer threaded surface configured to threadingly couple to a handle/cartridge assembly.

In an embodiment, threaded couplings of handle/cartridge assemblies and a faucet spout assembly are configured such that a rough-in body may be positioned within a wall at a varying depth. For instance a varying depth may be from about 1 mm to about 25 mm. A varying depth may still allow for proper threaded coupling of handle/cartridge assemblies and faucet spout assemblies to a rough-in assembly.

The term "flow communication" or "fluid communication" means for example configured for liquid or gas flow therethrough and may be synonymous with "fluidly coupled". The terms "upstream" and "downstream" indicate a direction of gas or fluid flow, that is, gas or fluid will flow from upstream to downstream.

The terms "coupled" or "connected" may mean that an element is "attached to" or "associated with" another element. Coupled or connected may mean directly coupled or coupled through one or more other elements. An element may be coupled to an element through two or more other elements in a sequential manner or a non-sequential manner. The term "via" in reference to "via an element" may mean "through" or "by" an element. Coupled or connected or "associated with" may also mean elements not directly or indirectly attached, but that they "go together" in that one may function together with the other.

The term "towards" in reference to a of point of attachment, may mean at exactly that location or point or, alternatively, may mean closer to that point than to another distinct point, for example "towards a center" means closer to a center than to an edge.

The term "like" means similar and not necessarily exactly like. For instance "ring-like" means generally shaped like a ring, but not necessarily perfectly circular.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, or ±5%. All numeric values are modified by the term "about" whether or not explicitly indicated. Numeric values modified by the term "about" include the specific identified value. For example "about 5.0" includes 5.0.

The term "substantially" is similar to "about" in that the defined term may vary from for example by ±0.05%, ±0.1%, ±0.2%, ±0.3%, ±0.4%, ±0.5%, ±1%, ±2%, ±3%, ±4%, or ±5% of the definition; for example the term "substantially perpendicular" may mean the 90° perpendicular angle may mean "about 90°". The term "generally" may be equivalent to "substantially".

Features described in connection with one embodiment of the disclosure may be used in conjunction with other embodiments, even if not explicitly stated.

Embodiments of the disclosure include any and all parts and/or portions of the embodiments, claims, description and figures. Embodiments of the disclosure also include any and all combinations and/or sub-combinations of embodiments.

The invention claimed is:

1. A rough-in body for a wall-mount faucet, comprising a cold water inlet configured to fluidly couple to a cold water source and a hot water inlet configured to fluidly couple to a hot water source; a first chamber configured to receive a first handle/cartridge assembly and a second chamber configured to receive a second handle/cartridge assembly; an outlet configured to fluidly couple to a faucet spout assembly; a cold water flow channel, a hot water flow channel, and a mixing chamber, wherein each of the cold water inlet, the hot water inlet, the outlet, the first chamber, and the second chamber comprise a central axis, the rough-in valve body is configured to be positioned within a wall by a mounting bracket having a mounting face parallel to the cold water inlet central axis and the hot water inlet central axis, the first chamber central axis, the second chamber central axis, and the outlet central axis are parallel to one another and are perpendicular to the cold water inlet central axis, the hot water central axis, and the mounting face of the mounting bracket, such that the first chamber central axis, the second chamber central axis, and the outlet central axis protrude from the wall and the cold water inlet central axis and the hot water inlet central axis extend vertically inside the wall, the rough-in body comprises a thermoplastic, the cold water inlet, the hot water inlet, the cold water flow channel, the hot water flow channel, the mixing chamber, and the outlet are in flow communication, the outlet comprises: an outer threaded surface configured to threadingly mate with an inner threaded surface of an annular coupling, and an outer unthreaded surface configured to be received within an inner surface of the faucet spout assembly to fluidly couple the outlet to the faucet spout assembly, and the annular coupling comprises an outer threaded surface configured to couple to the faucet spout assembly.

2. The rough-in body according to claim 1, wherein
the cold water flow channel and the hot water flow channel each comprise a central axis, and
the cold water flow channel central axis and the hot water flow channel central axis are aligned and are perpendicular to the cold water inlet central axis and to the hot water inlet central axis, and are perpendicular to the outlet central axis.

3. The rough-in body according to claim 1, wherein
the mixing chamber comprises a central axis, and
the mixing chamber central axis is aligned with the outlet central axis.

4. The rough-in body according to claim 1, comprising an engineering thermoplastic.

5. The rough-in body according to claim 4, wherein the engineering thermoplastic is selected from a group consisting of polyamides, polyesters, polycarbonates, acrylonitrile-butadiene-styrene, polysulfones (PSU), polyethersulfones (PESU), cyclic olefin copolymer (COC), acrylonitrile-styrene-acrylate (ASA), polyphenylene oxides (PPO), polyphenylene sulfides (PPS), polyphenylenesulfones (PPSU), polyether ether ketones (PEEK), polyethylenimine (PEI), polyphthalamides (PPA), polyacetals, copolymers thereof, and blends thereof.

6. The rough-in body according to claim 1, comprising a glass-filled polyamide or a glass-filled polyphthalamide.

7. The rough-in body according to claim 1, comprising an injection molded thermoplastic.

8. The rough-in body according to claim 1, comprising a body main part and a body rear wall, wherein the body main part and the body rear wall are bonded together to form the hot water flow channel and the cold water flow channel.

9. The rough-in body according to claim 1, wherein
the cold water inlet and the hot water inlet each comprise a smooth inner surface configured to receive and couple to a threaded adapter, and
once coupled, the threaded adapters are free to rotate within the cold water inlet and the hot water inlet.

10. The rough-in body according to claim 9, wherein the cold water inlet and the hot water inlet comprise slot-shaped openings, and the threaded adapters are configured to couple to the cold water inlet and the hot water inlet with a U-clip positioned in the slot-shaped openings.

11. A rough-in assembly comprising the rough-in body according to claim 1, and the annular coupling coupled to the outlet.

12. The rough-in body according to claim 1, wherein the first chamber and the second chamber each comprise an outer threaded surface configured to threadingly mate with the first and the second handle/cartridge assembly, respectively.

13. The rough-in body according to claim 1, wherein the rough-in body is configured to adjustably threadingly couple to the first handle/cartridge assembly, to the second handle/cartridge assembly, and to the faucet spout assembly, such that the rough-in valve body may be variably positioned within the wall relative to each of the first handle/cartridge assembly, the second handle/cartridge assembly, and the faucet spout assembly.

14. The rough-in body according to claim 1, wherein the outlet comprises an annular groove configured to receive an O-ring.

15. A rough-in assembly comprising the rough-in body according to claim 1, and threaded adapters coupled to each of the cold water inlet and the hot water inlet.

16. The rough-in assembly according to claim 15, wherein the threaded adapters are coupled to the cold water inlet and the hot water inlet with U-clips positioned in slot-shaped openings.

17. The rough-in assembly according to claim 15, wherein the threaded adapters comprise brass.

18. The rough-in assembly according to any of claim 15, wherein the threaded adapters comprise an inner threaded surface.

19. A wall-mount faucet assembly comprising the rough-in assembly according to claim 15, the first and the second handle/cartridge assemblies threadingly coupled to the first chamber and to the second chamber, respectively, and the faucet spout assembly threadingly coupled to the outlet.

* * * * *